(12) United States Patent
Kumasaka et al.

(10) Patent No.: US 7,367,857 B2
(45) Date of Patent: May 6, 2008

(54) EXHAUST STRUCTURE FOR SMALL WATERCRAFT

(75) Inventors: Tsuyoshi Kumasaka, Saitama (JP); Atsushi Kusuda, Saitama (JP); Masatsugu Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/708,642

(22) Filed: Feb. 21, 2007

(65) Prior Publication Data

US 2007/0199313 A1    Aug. 30, 2007

(30) Foreign Application Priority Data

Feb. 24, 2006    (JP) ............... 2006-049256

(51) Int. Cl.
*B63H 21/32*    (2006.01)

(52) U.S. Cl. ................. 440/89 B; 440/89 C; 440/89 J

(58) Field of Classification Search ............. 440/88 G, 440/88 J, 89 B, 89 C, 89 E, 89 F, 89 J, 89 R
See application file for complete search history.

(56) References Cited

U.S. PATENT DOCUMENTS

| | | | | |
|---|---|---|---|---|
| 5,740,670 A | * | 4/1998 | Woods | 440/89 R |
| 6,035,633 A | * | 3/2000 | Woods | 440/89 R |
| 6,120,335 A | * | 9/2000 | Nakase et al. | 440/89 B |
| 6,769,944 B2 | * | 8/2004 | Miura | 440/89 B |
| 6,913,499 B2 | * | 7/2005 | Matsuda | 440/89 R |

FOREIGN PATENT DOCUMENTS

JP    2003-176719 A    6/2003

* cited by examiner

*Primary Examiner*—Lars A. Olson
(74) *Attorney, Agent, or Firm*—Birch, Stewart, Kolasch & Birch, LLP

(57) ABSTRACT

To provide an exhaust structure for a small watercraft that can cool exhaust gas, reduce the size and weight, and thereby cost of a backflow prevention chamber. An exhaust structure for a small watercraft is configured to be able to cool exhaust gas in the course of leading it to the outside when the exhaust gas of an engine is led to the outside for discharge. This exhaust structure includes a water muffler containing water therein. A backflow prevention chamber is disposed above the water muffler and adapted to prevent water from entering the side of the engine from the side of the water muffler. The backflow prevention chamber is provided with a cooling water injecting portion adapted to spray cooling water to the exhaust gas in an internal space. An outlet is formed in the bottom portion of the backflow prevention chamber to communicate with the water muffler.

19 Claims, 7 Drawing Sheets

EXHAUST STRUCTURE FOR SMALL WATERCRAFT

CROSS-REFERENCE TO RELATED APPLICATIONS

This nonprovisional application claims priority under 35 U.S.C. § 119(a) on Patent Application No. 2006-049256, filed in Japan on Feb. 24, 2006, the entirety of which is incorporated herein by reference.

FIELD OF THE INVENTION

The present invention relates to an exhaust structure for a small watercraft that can cool exhaust gas by using cooling water on the way to the outside when the exhaust gas is led from an engine to the outside for discharge.

DESCRIPTION OF BACKGROUND ART

One exhaust structure for a small watercraft is disclosed in Japanese Patent Laid-open No. 2003-176719. This exhaust structure includes an exhaust system for discharging the exhaust gas of an engine to the outside. A water muffler is provided in the middle of the exhaust system. An exhaust body (backflow prevention chamber) adapted to prevent water from entering toward the engine from the water muffler is disposed above the water muffler. In addition, a water jacket is provided in the circumferential wall of the backflow prevention chamber.

When causing exhaust gas from the engine to flow in the exhaust system and discharge it to the outside, such an exhaust structure for a small watercraft can cool the exhaust gas in the backflow prevention chamber by allowing cooling water to flow in the water jacket.

However, the exhaust structure of Japanese Patent Laid-open No. 2003-176719 is provided with the water jacket serving as a cooling water passage, in the circumferential wall of the backflow prevention chamber. It is necessary, therefore, to relatively increase the thickness of the circumferential wall of the backflow prevention chamber. This hinders the downsizing and weight saving of the backflow prevention chamber. In addition, the provision of the water jacket in the circumferential wall of the backflow prevention chamber complicates the shape of the chamber, which hinders the decrease in the cost of the chamber.

SUMMARY OF THE INVENTION

It is an object of the present invention to provide an exhaust structure for a small watercraft that can cool exhaust gas, reduce the size and weight, and thereby reduce the cost of a backflow prevention chamber.

A first aspect of the present invention is directed to an exhaust structure for a small watercraft that uses cooling water to cool exhaust gas on the way to the outside when the exhaust gas is led from an engine to the outside for discharge. The exhaust structure includes: a water muffler disposed in the course of leading the exhaust gas to the outside to receive the cooling water that has cooled the exhaust gas; a backflow prevention chamber disposed above the water muffler, having a bottom portion formed thereat with an outlet communicating with the water muffler, and adapted to prevent water entering a side of the engine from a side of the water muffler; and a cooling water injecting portion disposed in the backflow prevention chamber and adapted to lead and spray the cooling water to the exhaust gas in the backflow prevention chamber.

According to a second aspect of the present invention, the backflow prevention chamber is internally provided with a gas introduction pipe adapted to lead exhaust gas into the backflow prevention chamber, the gas introduction pipe is disposed to extend across above the outlet, and a cooling water injection port of the cooling water injecting portion is disposed in the vicinity of the outlet of the gas introduction pipe.

According to a third aspect of the present invention, the cooling water injecting portion includes: a cooling water passage adapted to lead the cooling water; and a cooling water injection port adapted to inject and spray the cooling water led through the cooling water passage, to the exhaust gas in the backflow prevention chamber. In the third aspect of the present invention, the cooling water passage is formed of a member independent of the backflow prevention chamber.

According to the first aspect of the present invention, the backflow prevention chamber is provided with the cooling water injecting portion, which sprays cooling water to the exhaust gas in the backflow prevention chamber. There is an advantage with this structure in that spraying cooling water therein can cool the exhaust gas.

Thus, it is not necessary to provide a water jacket serving as a cooling water passage in the circumferential wall of the backflow prevention chamber. Since this eliminates an unnecessary increase in thickness of the circumferential wall of the backflow prevention chamber, there is an advantage in that the backflow prevention chamber can be reduced in size and weight.

In addition, since there is no need to provide a water jacket in the circumferential wall of the backflow prevention chamber, there is an advantage in that the configuration of the backflow prevention chamber can be simplified, thereby reducing cost.

The cooling water sprayed in the exhaust gas flows on the bottom portion of the backflow prevention chamber. Therefore, the outlet communicating with the water muffler is provided in the bottom portion of the backflow prevention chamber.

The cooling water sprayed in the exhaust gas in the backflow prevention chamber flows on the bottom portion of the backflow prevention chamber and is satisfactorily led from the outlet of the bottom portion to the water muffler. This provides an advantage in that the cooling water sprayed in the exhaust gas can be prevented from entering toward the engine side.

According to the second aspect of the present invention, the gas introduction pipe is provided in the backflow prevention chamber and the cooling water injection port adapted to inject cooling water is provided in the vicinity of the outlet of the gas introduction pipe. Thus, when the exhaust gas is led from the outlet of the gas introduction chamber to the backflow prevention chamber, the cooling water can be sprayed in the exhaust gas thus led.

This makes it possible to satisfactorily spray the cooling water in the exhaust gas before the exhaust gas is led to the backflow prevention chamber for diffusion, providing an advantage of preferably cooling the exhaust gas. Furthermore the gas introduction prevention chamber is disposed across above the outlet provided in the bottom portion of the backflow prevention chamber. This enables the circumferential wall of the gas introduction to isolate the inside of the gas introduction pipe from the outlet of the backflow prevention chamber.

Thus, the cooling water sprayed in the exhaust gas is satisfactorily prevented from flowing in the inside of the gas introduction pipe when led from the outlet of the bottom portion to the water muffler. This provides an advantage in that the cooling water sprayed in the exhaust gas can be further satisfactorily prevented from entering toward the engine side through the inside of the gas introduction pipe.

According to the third aspect of the present invention, the cooling water passage is formed of a member independent of the backflow prevention chamber. Therefore, it can be an independent member. This can simplify the configuration of the cooling water passage, thereby providing an advantage of facilitating fabrication.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be hereinunder described with reference to the accompanying drawings. It should be noted that the terms "front", "rear", "left" and "right" denote the direction as viewed from an operator and the symbols Fr, Rr, L and R denotes the front, the rear or back, the left and the right, respectively.

Figure 1:
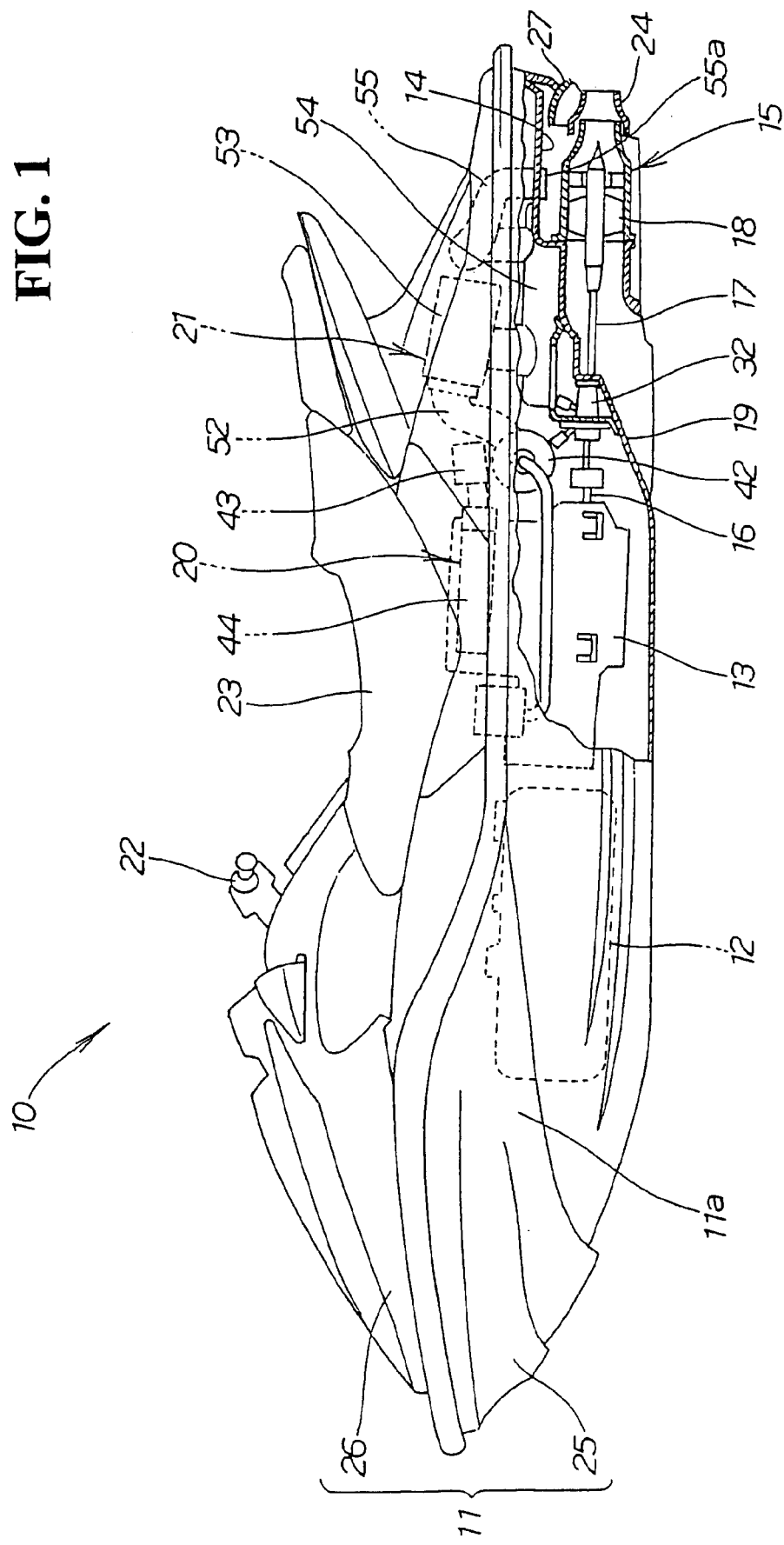
FIG. 1 is a side view of a small watercraft according to an embodiment of the present invention.

FIG. 1 is a side view of a small watercraft according to an embodiment of the present invention. The small watercraft 10 is a water-jet propelling boat that includes a fuel tank 12 disposed at a front portion 11a of a watercraft body 11. An engine 13 is disposed rearward of the fuel tank 12. A pump chamber 14 is disposed rearward of the engine 13. A water-jet pump 15 is placed in the pump chamber 14. A drive shaft 17 is adapted to connect the water-jet pump 15 to an output shaft 16 of the engine 13. In addition, the water-jet propelling boat includes an air intake structure 20 adapted to supply air to the engine 13. An exhaust structure (exhaust structure for a small watercraft) 21 is adapted to discharge exhaust gas from the engine 13. A steering handlebar 22 is disposed above the fuel tank 12. A seat 23 is disposed rearward of the steering handlebar 22.

The watercraft body 11 is configured such that a hull 25, constituting the lower portion of the watercraft body 11, is covered by and joined to a deck 26, constituting the upper portion of the watercraft body 11. With the small watercraft 10, the engine 13 is driven to rotate the drive shaft 17, thereby rotating an impeller 18, which is built in the water-jet pump 15. Rotating the impeller 18 takes in water from a suction opening 19 at the bottom of the watercraft and the water taken in is ejected rearward of the watercraft body 11 from a steering nozzle 24 through the inside of the water-jet pump 15. Thus, the watercraft 10 is propelled (glides) forwardly.

On the other hand, when the watercraft 10 is moved rearward, a reverse bucket 27 disposed above the steering nozzle 24 is shifted to a reverse position located rearward of the steering nozzle 24. Thus, the water ejected rearward from the steering nozzle 24 is led to the front of the watercraft body 11, whereby the ejected water thus led moves the watercraft 10 backward.

Figure 2:
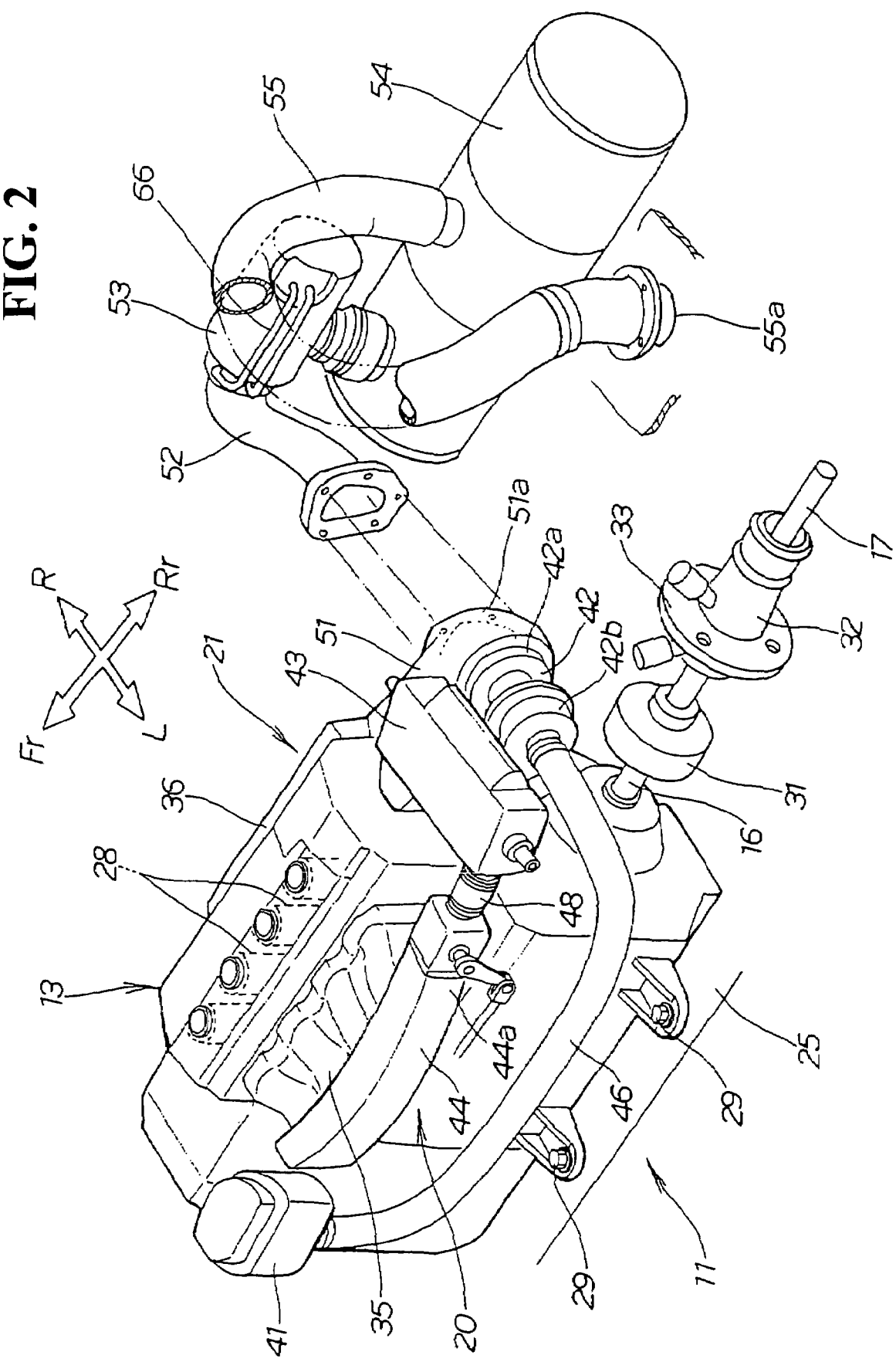
FIG. 2 is a perspective view illustrating the inside of the small watercraft according to an embodiment of the present invention.

FIG. 2 is a perspective view illustrating the inside of the watercraft according to an embodiment of the present invention. The engine 13 includes a plurality of cylinders 28 arranged in the back-and-forth direction of the watercraft body 11 and left-hand and right-hand mount portions fastened to the hull 25 with bolts 29. In short, the engine 13 is longitudinally mounted on the watercraft body 11.

The output shaft 16 projects from the rear lower end of the engine 13 toward the back of the watercraft body 11. The drive shaft 17 is coupled to the output shaft 16 via a connection coupler 31. The drive shaft 17 is rotatably journaled by a bearing portion 32 and is coupled at its rear end to the water-jet pump 15 (see FIG. 1). A flange portion 33 provided on the bearing portion 32 is fastened to the hull 25 with bolts and nuts.

Since the engine 13 is mounted longitudinally with respect to the watercraft body 11, an intake passage 35 is disposed on the left side (one side) of the plurality of cylinders 28 and an exhaust passage 36 is disposed on the right side (the other side) of the cylinders 28.

The intake passage 35 constitutes, e.g. an intake manifold and the exhaust passage 36 constitutes, e.g. an exhaust manifold. The intake passage 35 is a member constituting part of the intake structure 20 and communicates with the cylinders 28. The exhaust passage 36 is a member constituting part of the exhaust structure 21 and communicates with the cylinders 28.

The air intake structure 20 includes an air cleaner 41, a turbocharger 42, an inter-cooler 43, a distribution passage 44 and the intake passage 35. The air cleaner 41 communicates with the turbocharger 42 via an air introduction pipe 46. The turbocharger 42 communicates with the inter-cooler 43, which in turn communicates with the distribution passage 44 via a distribution passage communicating portion 48. The distribution passage 44 communicates with an intake port of the intake passage 35.

The exhaust structure 21 of a small watercraft includes an exhaust passage 36, a first exhaust pipe 51, a second exhaust pipe 52, a backflow prevention chamber 53, a cooling water injecting portion 66, a water muffler 54 and an exhaust hose 55. Incidentally, the backflow prevention chamber 53 and the cooling water injecting portion 66 are detailed with reference to FIGS. 3 through 7.

The first exhaust pipe 51 is provided to extend from the rear end portion of the exhaust passage 36 toward the rearward of the watercraft body. The rear end portion 51a of the first exhaust pipe 51 communicates with a second exhaust pipe 52 and with the turbocharger 42. The second exhaust pipe 52 communicates with the backflow prevention chamber 53, which communicates with the water muffler 54. The water muffler 54 communicates with the exhaust hose 55, whose discharge port 55a faces the inside of the pump chamber 14 (see FIG. 1).

According to the air intake structure 20 and the exhaust structure 21 for a small watercraft, exhaust gas is led from the inside of the cylinders 28 to the exhaust passage 36 and then led therefrom to the first exhaust pipe 51. Most of the exhaust gas led to the first exhaust pipe 51 is discharged through the second exhaust pipe 52, the backflow prevention chamber 53, the water muffler 54 and the exhaust hose 55.

On the other hand, the remaining of the exhaust gas led to the first exhaust pipe 51 is led to the turbine casing 42a. The exhaust gas led to the turbine casing 42a rotates turbine impellers (not shown). The rotating turbine impellers rotate compressor impellers (not shown) in the compressor casing 42b.

Air is sucked in the air cleaner 41 simultaneously with the rotation of the compressor impellers. The air sucked in the air cleaner 41 is led into the compressor casing 42b of the turbocharger 42 through the air introduction pipe 46. Since the compressor impellers (not shown) in the compressor casing 42b are rotated as described earlier, the air led in the compressor casing 42b is compressed and led into the inter-cooler 43 therefrom.

The air cooled in the inter-cooler 43 is led to the distribution passage 44 via the distribution passage communicating portion 48. The air led into the distribution passage 44 is led to the intake passage 35 and supplied to the cylinders 28 therefrom.

Figure 3:
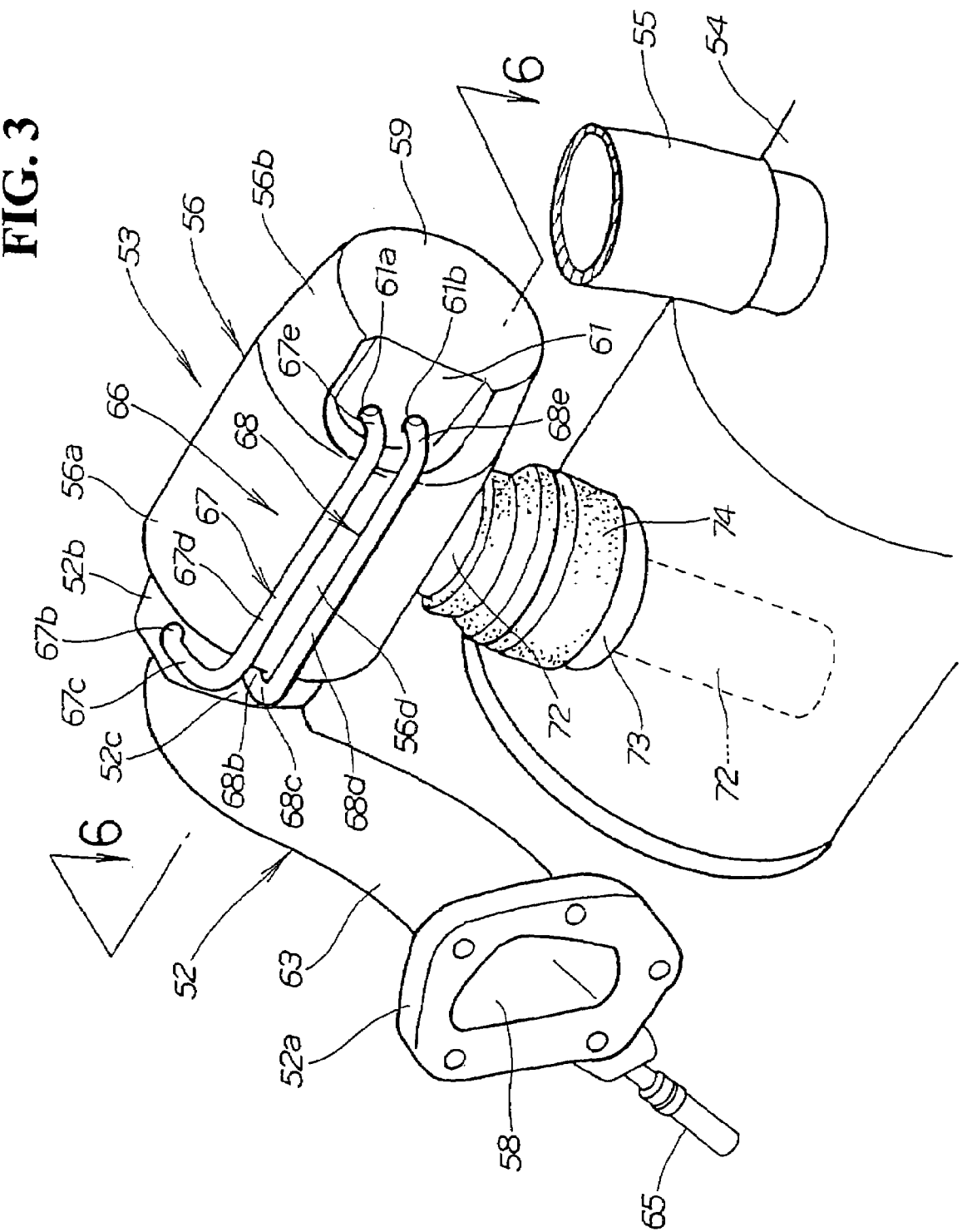
FIG. 3 is a perspective view of an exhaust structure of the watercraft according to an embodiment of the present invention.
Figure 4:
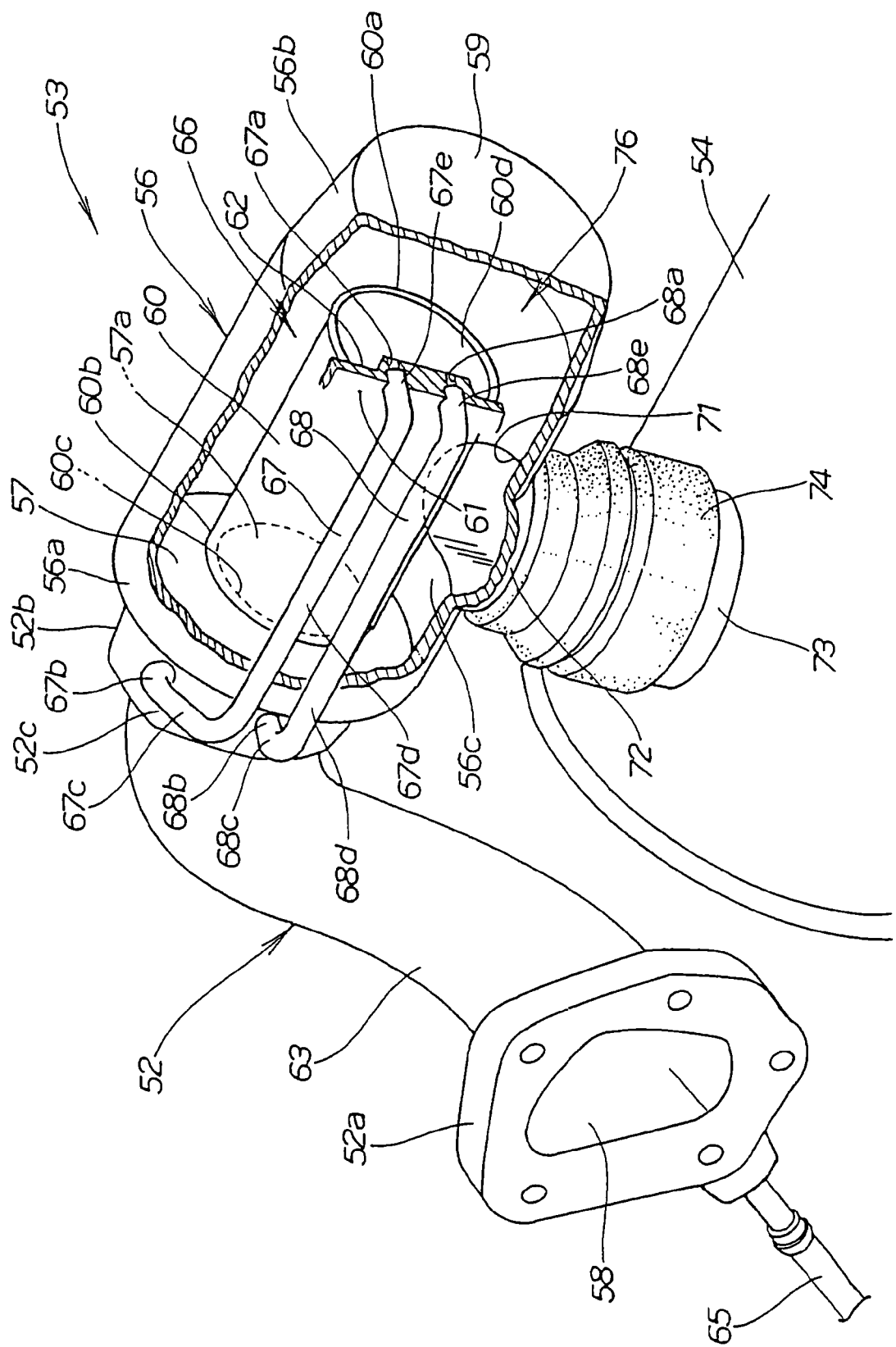
FIG. 4 is a cross-sectional view of a backflow prevention chamber according to the an embodiment of present invention.

FIG. 3 is a perspective view illustrating the exhaust structure for a small watercraft according to an embodiment of the invention and FIG. 4 is a cross-sectional view of the backflow prevention chamber of the exhaust structure according to an embodiment of the invention.

The second exhaust pipe 52 extends upward from a front end portion 52a thereof and a front wall portion 57 of the backflow prevention chamber 53 is joined to a rear end portion 52b of the second exhaust pipe 52. A passage 58 of the second exhaust pipe 52 communicates with an opening 57a of the backflow prevention chamber 53. This opening 57a is formed in the front wall portion 57 of the backflow prevention chamber 53.

A water jacket 64 (see FIGS. 5 and 6) is provided in the circumferential wall 63 of the second exhaust pipe 52. A cooling water introduction pipe 65 is joined to the front end portion 52a of the second exhaust pipe 52. The cooling water introduction pipe 65 communicates with the water jacket 64.

The backflow prevention chamber 53 is such that an outer cylindrical body 56 is disposed above the water muffler 54, the front wall portion 57 is disposed at the front end portion 56a of the outer cylindrical body 56. A rear wall portion 59 is disposed at the rear end portion 56b of the outer cylindrical body 56. An inner cylindrical body (hereinafter referred to as a "gas introduction pipe") 60 is provided inside the outer cylindrical body 56.

Upper and lower cooling water injection ports 67a and 68a are disposed near the rear end portion 60a of the gas introduction pipe 60. The upper and lower cooling water injection ports 67a, 68a are members constituting the injection port of the cooling water injecting portion 66.

The water muffler 54 is disposed in the course of directing the exhaust gas discharged from the engine 13 (see FIG. 2) to the outside and receives the cooling water that cooled the exhaust gas. This water muffler 54 is the same as one used in common small watercrafts.

The outer cylindrical body 56 is formed almost cylindrical and is disposed parallel to the water muffler 54 so as to face in the back-and-forth direction of the watercraft body 11 (see FIG. 1). The outer cylindrical body 56 is such that the front wall portion 57 is formed with the opening 57a and the rear end portion 56b is slightly tapered and closed with the rear wall portion 59.

The outer cylindrical body 56 is formed with a recessed portion 61 at a portion, of the rear end portion 56b, facing the central side of the watercraft body 11. The recessed portion 61 is formed with upper and lower attachment holes 61a, 61b. The upper and lower attachment holes 61a and 61b are adapted to be attached with upper and lower cooling water passages 67 and 68, respectively. The upper and lower cooling water passages 67, 68 are members constituting the cooling water passage of the cooling water injecting portion 66 described later.

A back surface 62 of the recessed portion 61 is formed with the upper and lower cooling water injection ports 67a and 68a. The back surface 62 of the recessed portion 61 is a wall surface, of the inner wall of the outer cylindrical body 56, corresponding to the recessed portion 61.

The upper and lower cooling water injection ports 67a, 68a are disposed in a space between the rear end portion 60a of the gas introduction pipe 60 and the rear wall portion 59 of the outer cylindrical body 56 and in the vicinity of an outlet 60d of the gas introduction pipe 60. The upper and lower cooling water injection ports 67a and 68a communicate with the upper and lower attachment holes 61a and 61b, respectively, (see FIG. 3).

Thus, the attachment of the upper cooling water passage 67 to the upper attachment hole 61a causes the upper cooling water passage 67 to communicate with the upper cooling water injection port 67a. Similarly, the attachment of the lower cooling water passage 68 to the lower attachment hole 61b causes the lower cooling water passage 68 to communicate with the lower cooling water injection port 68a.

The outer cylindrical body 56 is formed at its bottom portion 56c with an outlet 71, from which an outlet pipe 72 extends downward. The outlet pipe 72 is inserted into an inlet pipe 73 of the water muffler 54 and a gap between the outlet pipe 72 and the inlet pipe 73 is tightly closed with a communication hose 74.

The gas introduction pipe 60 is a hollow cylindrical body having a diameter smaller than that of the outer cylindrical body 56 and is disposed in an internal space 76 of the outer cylindrical body 56 coaxially therewith. The gas introduction pipe 60 is formed with an inlet 60c in the front end portion 60b and with an outlet 60d in the rear end portion 60a. The front end portion 60b of the gas introduction pipe 60 is provided on the front wall portion 57 and along the lip of the opening 57a. In short, the opening 57a of the front wall portion 57 communicates with the inlet 60c of the front end portion 60b.

The passage 58 of the second exhaust pipe 52 communicates with the internal space 76 of the backflow prevention chamber 53 through the opening 57a, the inlet 60c, and the outlet 60d. In this way, the exhaust gas in the passage 58 is led in the internal space 76, led therefrom to the outlet pipe 72 via the outlet 71 and then led therefrom to the water muffler 54.

Since disposed coaxially with the outer cylindrical body 56, the gas introduction pipe 60 is provided across above the outlet 71. This enables the circumferential wall of the gas introduction pipe 60 to isolate the inside of the gas introduction pipe 60 from the outlet 71.

If the watercraft 10 (see FIG. 1) turns over, it is probable that the water provided in the water muffler 54 enters the internal space 76 from the outlet 71 via the outlet pipe 72. For this reason, as described above, the circumferential wall of the gas introduction pipe 60 isolates the inside of the gas introduction pipe 60 from the outlet 71, whereby the water entering the internal space 76 from the outlet 71 is interrupted by the circumferential wall of the gas introduction pipe 60.

In this way, the water entering the internal space 76 from the outlet 71 can be prevented from entering the inside of the gas introduction pipe 60 from the engine 13 side shown in FIG. 2. In short, the backflow prevention chamber 53 has a backflow prevention function, which prevents water entering from the side of the water muffler 54 to the side of the engine 13.

The backflow prevention chamber 53 is provided with the cooling water injecting portion 66 as described earlier. The cooling water injecting portion 66 leads and sprays cooling water to the exhaust gas in the backflow prevention chamber 53.

The cooling water injecting portion 66 includes the upper and lower cooling water passages 67, 68 adapted to lead cooling water. The upper and lower cooling water injection ports 67a, 68a are adapted to inject and spay the cooing water led through the upper and lower cooling water passages 67, 68 to the exhaust gas in the backflow prevention chamber 53. The upper and lower cooling water passages 67, 68 are formed of members independent of the backflow prevention chamber 53.

The upper cooling water passage 67 is composed of a front end portion 67b, a front pipe portion 67c, a central pipe portion 67d and a rear pipe portion 67e. The front end portion 67b is joined to the side wall 52c of the rear end portion 52b. The front pipe portion 67c extends from the front end portion 67b toward the central side of the watercraft body 11 (see FIG. 1). The central pipe portion 67d extends from an end portion of the front pipe portion 67c toward the rearward of the watercraft body 11, passing along the side wall 56d of the outer cylindrical body 56. The rear pipe portion 67e extends from the rear end portion of the central pipe portion 67d toward the bottom surface of the recess portion 61. Thus, the upper cooling water passage 67 is formed in an approximate shallow-U-shape as viewed from above.

The end portion of the rear pipe portion 67e is attached to the upper attachment hole 61a so that the rear pipe portion 67e communicates with the upper cooling water injection port 67a.

The lower cooling water passage 68 is disposed below and in parallel to the upper cooling water passage 67. Similarly to the upper cooling water passage 67, the lower cooling water passage 68 is composed of a front end portion 68b, a front pipe portion 68c, a central pipe portion 68d and a rear pipe portion 68e. The front end portion 68b is joined to the side wall 52c of the rear end portion 52b. The front pipe portion 68c extends from the front end portion 68b toward the central side of the watercraft body 11 (see FIG. 1). The central pipe portion 68d extends from an end portion of the front pipe portion 68c toward the rearward of the watercraft body 11, passing along the side wall 56d of the outer cylindrical body 56. The rear pipe portion 68e extends from the rear end portion of the central pipe portion 68d toward the bottom surface of the recessed portion 61. Thus, the lower cooling water passage 68 is formed in an approximate shallow-U-shape as viewed from above.

The end portion of the rear pipe portion 68e is attached to the lower attachment hole 61b so that the rear pipe portion 68e communicates with the upper cooling water injection port 68a.

The upper and lower cooing water injection ports 67a, 68a are disposed close to the outlet 60d of the gas introduction pipe 60. Therefore, cooling water can satisfactorily be sprayed to exhaust gas that does not yet diffuse in the internal space 76.

As described above, the front pipe portion 67c, the central pipe portion 67d, and the rear pipe portion 67e which constitute the upper cooling water passage 67 are each made independent of the outer cylindrical body 56. Similarly, the front pipe portion 68c, the central pipe portion 68d, and the rear pipe portion 68e which constitute the lower cooling water passage 68 are each made independent of the outer cylindrical body 56.

As described above, since the upper and lower cooling water passages 67 and 68 are made independent of the outer cylindrical body 56, the upper and lower cooling water passages 67 and 68 can be made of separate members. This can simplify the respective configurations of the upper and lower cooling water passages 67, 68, thereby facilitating fabrication.

Figure 5:
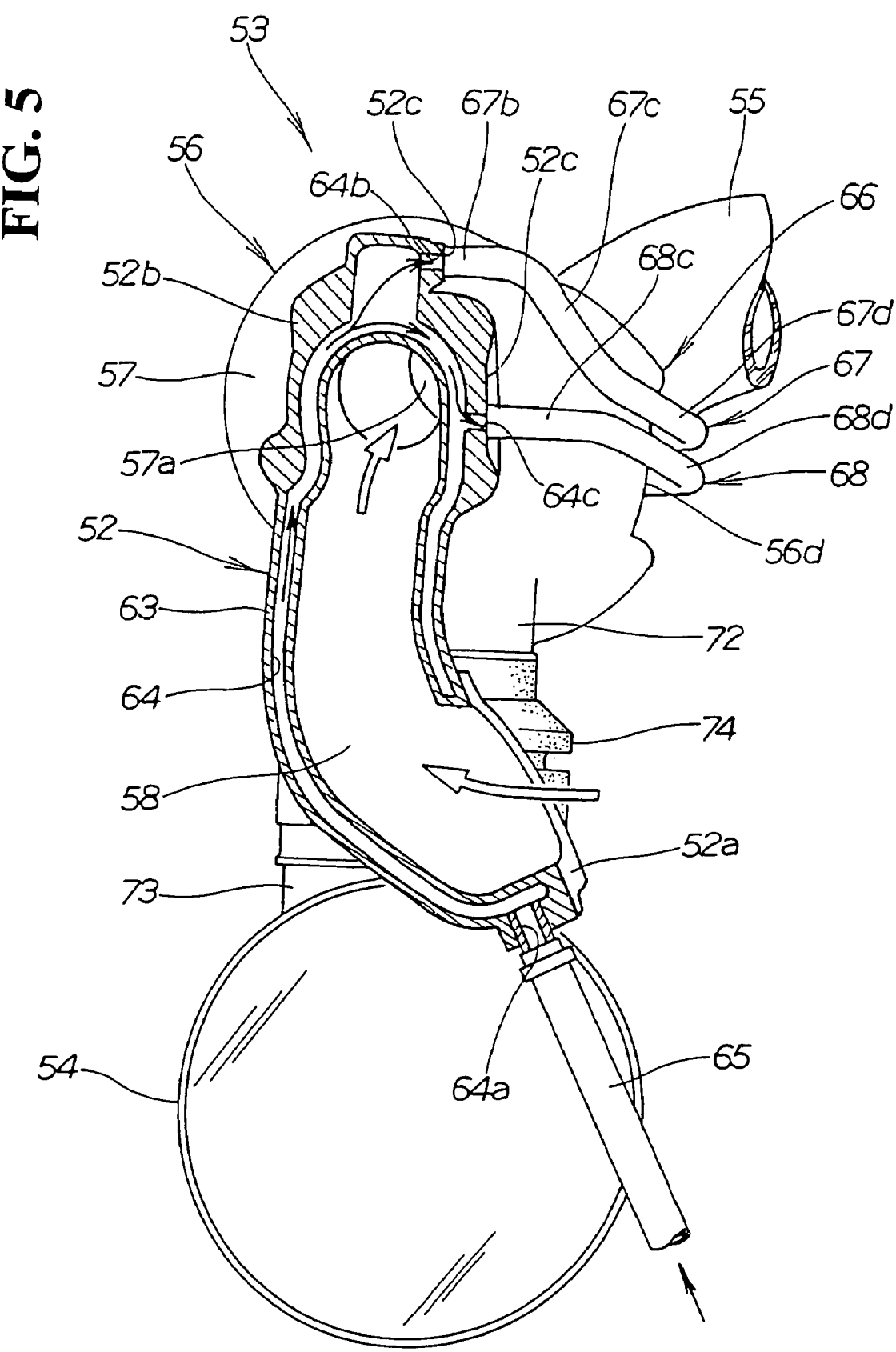
FIG. 5 is a cross-sectional view of a second exhaust pipe of the exhaust structure according to an embodiment of the present invention.
Figure 6:
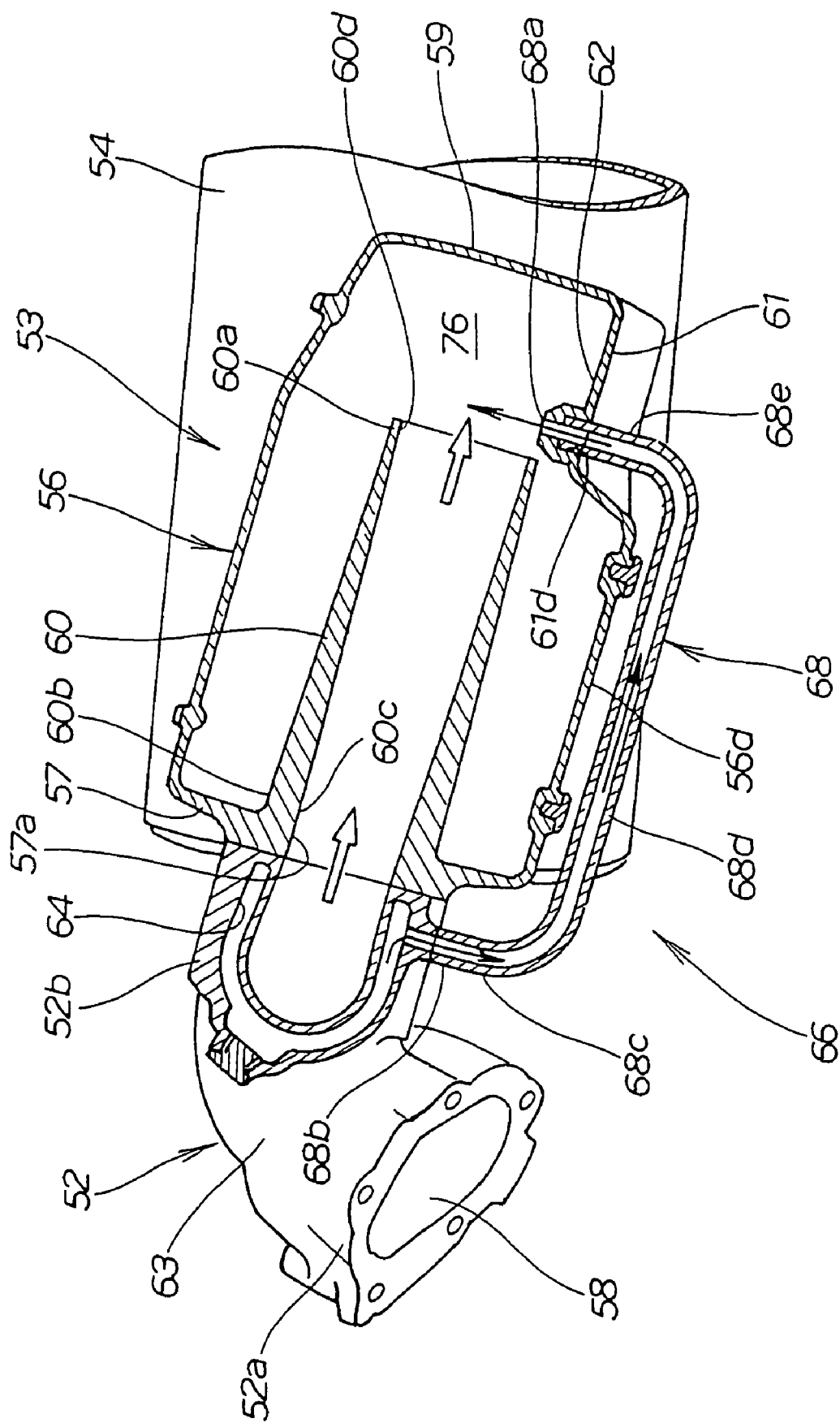
FIG. 6 is a cross-sectional view taken along line 6-6 of FIG. 3.

FIG. 5 is a cross-sectional view of the second exhaust pipe of the exhaust structure according to the present invention and FIG. 6 is a cross-sectional view taken along line 6-6 of FIG. 3.

The second exhaust pipe 52 is such that the circumferential wall 63 forms the passage 58 and the water jacket 64 is provided in the circumferential wall 63. The passage 58 communicates with the passage of the first exhaust pipe 51 shown in FIG. 2 at the front end portion 52a of the second exhaust pipe 52. Furthermore, the passage 58 communicates with the opening 57a of the backflow prevention chamber 53 at the rear end 52b of the second exhaust pipe 52.

Thus, exhaust gas led from the first exhaust pipe 51 to the passage 58 as indicated with arrows is led therefrom to the opening 57a of the backflow prevention chamber 53 as indicated with arrows.

Exhaust gas led to the opening 57a is led from the inlet 60c of the gas introduction pipe 60 into the gas introduction pipe 60 as indicated with arrows and, through the inside of the gas introduction pipe 60, led from the outlet 60d to the internal space 76 of the backflow prevention chamber 53 as indicated with arrows.

The water jacket 64 communicates with the cooling water introduction pipe 65 via an introduction port 64a at the front end portion 52a of the second exhaust pipe 52. Furthermore, the water jacket 64 communicates with the upper cooling water passage 67 via an upper outlet 64b at the rear end portion 52b of the second exhaust pipe 52. In addition, the water jacket 64 communicates with the lower cooling water passage 68 via a lower outlet 64c at the rear end portion 52b of the second exhaust pipe 52.

Thus, cooling water led from the cooling water introduction pipe 65 to the water jacket 64 as indicated with arrows is led to the upper cooling water passage 67 via the upper outlet 64b as indicated with arrows and also to the lower cooling water passage 68 via the lower outlet 64c as indicated with arrows. The cooling water led to the lower cooling water passage 68 is led to the lower cooling water injection port 68a via the lower cooling water passage 68 and is injected therefrom into the internal space 76 of the outer cylindrical body 56.

In addition, similarly to the cooling water led to the lower cooling water passage 68, the cooling water led to the upper cooling water passage 67 is led to the upper cooling water injection port 67a (see FIG. 4) via the upper cooling water passage 67 and injected therefrom into the internal space 76 of the outer cylindrical body 56.

Figure 7:
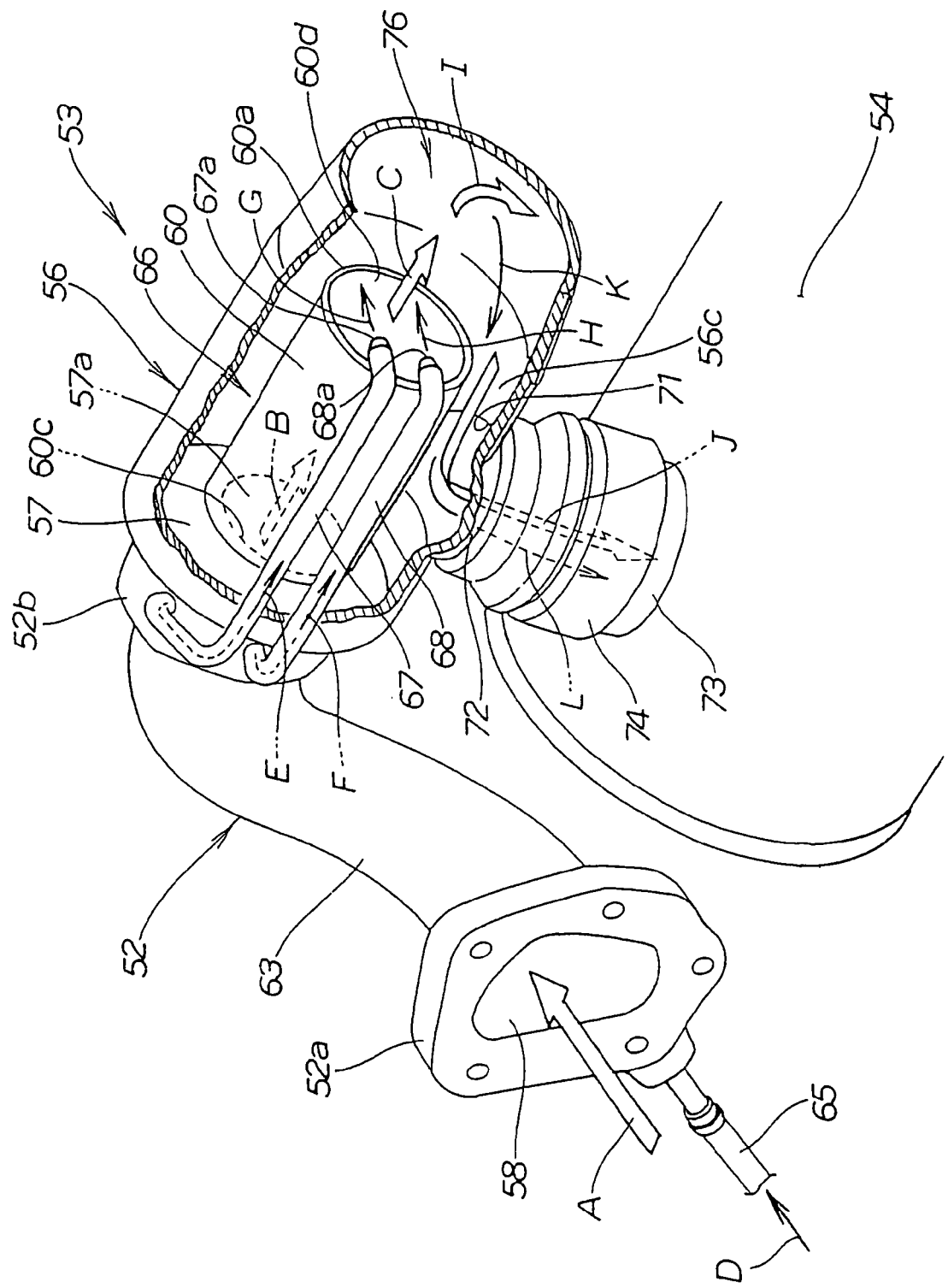
FIG. 7 is a diagram for assistance in explaining an example of cooling exhaust gas by means of the exhaust structure of watercraft according to an embodiment of the present invention.

A description will now be provided of an example in which exhaust gas is cooled by the exhaust structure 21 for a small watercraft with reference to FIG. 7. FIG. 7 is a diagram for assistance in explaining the example in which exhaust gas is cooled by the exhaust structure for a small watercraft.

It is to be noted that for easy understanding of a flow of cooling water, FIG. 7 illustrates that the upper and lower cooling water injection ports 67a and 68a are provided at the leading ends of the upper and lower cooling water passages 67 and 68, respectively.

Exhaust gas is led from the first exhaust pipe 51 shown in FIG. 2 to the passage 58 of the second exhaust pipe 52 as indicated with arrow A. The exhaust gas led to the passage 58 is led therethrough toward the opening 57a of the backflow prevention chamber 53. The exhaust gas led to the opening 57a is led from the inlet 60c of the gas introduction pipe 60 into the gas introduction pipe 60 as indicated with arrow B. The exhaust gas led into the gas introduction pipe 60 is led therethrough from the outlet 60d to the internal space 76 of the backflow prevention chamber 53 as indicated with arrow C.

On the other hand, the cooling water led through the cooling water introduction pipe 65 as indicated with arrow D is led therefrom to the water jacket 64 (see FIG. 5). The cooling water led to the water jacket 64 is led to the upper cooling water passage 67 as indicated with arrow E and also to the lower cooling water passage 68 as indicated with arrow F.

The cooling water led to the upper cooling water passage 67 is led therethrough to the upper cooling water injection port 67a and injected therefrom in the internal space 76 of the outer cylindrical body 56 as indicated with arrow G The cooling water led to the lower cooling water passage 68 is led therethrough to the lower cooling water injection port 68a and injected therefrom in the internal space 76 of the outer cylindrical body 56 as indicated with arrow H.

The upper and lower cooling water injection ports 67a, 68a are disposed in the vicinity of the outlet 60d of the gas introduction pipe 60. The cooling water injected from the upper and lower cooling water injection ports 67a, 68a can be sprayed in the exhaust gas led to the internal space 76 from the outlet 60d.

Thus, the cooling water can be satisfactorily sprayed in the exhaust gas that does not yet diffuse in the internal space 76, thereby satisfactorily spraying the cooling water in the exhaust gas to preferably cool the exhaust gas. This eliminates a water jacket serving as a cooling water passage otherwise to be provided in the circumferential wall of the outer cylindrical body 56.

The exhaust gas cooled by cooling water is led downward by the rear wall portion 59 (see FIG. 4) as indicated with arrow I by way of example. The exhaust gas led downward is led to the bottom portion 56c and then led therefrom through the outlet 71 into the outlet pipe 72 as indicated with arrow J. The exhaust gas led into the outlet pipe 72 is led into the water muffler 54.

On the other hand, the cooling water sprayed to the exhaust gas is led to the bottom portion 56c as indicated with arrow K and then led therefrom through the outlet 71 into the outlet pipe 72 as indicated with arrow L. The cooling water led into the outlet pipe 72 is led into the water muffler 54.

Thus, the cooling water sprayed to the exhaust gas can be prevented from entering the second exhaust pipe 52, thereby preventing the cooling water from entering toward the engine 13 shown in FIG. 2.

The gas introduction pipe 60 is disposed to extend across above the outlet 71 provided in the bottom portion 56c of the outer cylindrical body 56. Therefore, the circumferential wall of the gas introduction pipe 60 can isolate the inside of the gas introduction pipe 60 from the outlet 71. Thus, when led from outlet 71 to the water muffler 54, the cooling water sprayed to the exhaust gas can be satisfactorily prevented from entering the second exhaust pipe 52 from the inside of the gas introduction pipe 60.

In this way, the cooling water sprayed to the exhaust gas can be further satisfactorily prevented from entering toward the engine 13 through the inside of the gas introduction pipe 60. In short, the backflow prevention chamber 53 has a backflow prevention function of preventing the cooling water sprayed to the exhaust gas from entering toward the engine 13 through the inside of the gas introduction pipe 60.

As described above, the exhaust structure 21 of the small watercraft can satisfactorily cool exhaust gas by using cooling water in the course of leading the exhaust gas to the outside when the exhaust gas is led from the engine 13 shown in FIG. 2 to the outside for discharge.

Incidentally, the present embodiment describes the example in which the cooling water injecting portion 66 is provided with the two, upper and lower cooling water passages 67, 68. However, the number of the cooling water passages can be selected arbitrarily.

In addition, the present embodiment describes the example in which the backflow prevention chamber 53 is provided with the two, upper and lower cooling water injection ports 67a, 68a. However, the present invention is not limited to this embodiment. The upper and lower cooling water injection ports 67a and 68a may be directly provided at the upper and lower cooling water passages 67 and 68, respectively.

Furthermore, the shape of the upper and lower cooling water passages 67, 68 exemplified in the embodiment is modifiable appropriately.

The present invention can be preferably applicable to an exhaust structure of a small watercraft that can cool exhaust gas on the way to the outside when the exhaust gas is led from an engine thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust structure for a small watercraft that uses cooling water to cool exhaust gas when the exhaust gas is led from an engine to the outside for discharge, the exhaust structure comprising:

a water muffler disposed in the course of leading the exhaust gas to the outside to receive the cooling water that has cooled the exhaust gas;

a backflow prevention chamber disposed above the water muffler, said backflow prevention chamber having a bottom portion formed with an outlet in communication with the water muffler, and adapted to prevent water from entering the engine from the water muffler; and a cooling water injecting portion disposed in the backflow prevention chamber and adapted to lead and spray the cooling water to the exhaust gas in the backflow prevention chamber.

2. The exhaust structure for a small watercraft according to claim 1, wherein the backflow prevention chamber is internally provided with a gas introduction pipe adapted to lead exhaust gas into the backflow prevention chamber, the gas introduction pipe is disposed to extend across above the outlet of the backflow prevention chamber, and a cooling water injection port of the cooling water injecting portion is disposed in the vicinity of the outlet of the gas introduction pipe.

3. The exhaust structure for a small watercraft according to claim 1, wherein the cooling water injecting portion includes:

a cooling water passage adapted to lead the cooling water; and a cooling water injection port adapted to inject and spray the cooling water led through the cooling water passage to the exhaust gas in the backflow prevention chamber, wherein the cooling water passage is formed of a member independent of the backflow prevention chamber.

4. The exhaust structure for a small watercraft according to claim 1, further comprising an exhaust pipe in communication with the backflow prevention chamber, said exhaust pipe including a water jacket formed therein, wherein the cooling water injecting portion is in communication with the water jacket of the exhaust pipe.

5. The exhaust structure for a small watercraft according to claim 2, further comprising an exhaust pipe in communication with the gas introduction pipe in the backflow prevention chamber, said exhaust pipe including a water jacket formed therein, wherein the cooling water injecting portion is in communication with the water jacket of the exhaust pipe.

6. The exhaust structure for a small watercraft according to claim 3, further comprising an exhaust pipe in communication with the backflow prevention chamber, said exhaust pipe including a water jacket formed therein, wherein the cooling water injecting portion is in communication with the water jacket of the exhaust pipe.

7. The exhaust structure for a small watercraft according to claim 1, wherein the backflow prevention chamber includes a generally cylindrical body, and the cooling water injecting portion includes at least one cooling water passage located outside of the generally cylindrical body.

8. The exhaust structure for a small watercraft according to claim 2, wherein the backflow prevention chamber includes a generally cylindrical body, and the cooling water injecting portion includes at least one cooling water passage located outside of the generally cylindrical body.

9. The exhaust structure for a small watercraft according to claim 3, wherein the backflow prevention chamber includes a generally cylindrical body, and the cooling water passage is located outside of the generally cylindrical body.

10. The exhaust structure for a small watercraft according to claim 1, wherein said backflow prevention chamber is in communication with an opening of a gas introduction pipe, and said cooling water injecting portion includes a cooling water injecting port disposed to spray cooling water adjacent the opening of the gas introduction pipe.

11. An exhaust structure for a small watercraft, comprising:

an exhaust pipe having exhaust gas flowing therethrough, said exhaust pipe having a water jacket formed therein;

a water muffler in communication with the exhaust pipe for receiving the exhaust gas;

a backflow prevention chamber disposed above the water muffler, said backflow prevention chamber having a bottom portion formed with an outlet in communication with the water muffler and an inlet in communication with the exhaust pipe, said backflow prevention chamber being adapted to prevent water from entering the exhaust pipe from the water muffler; and a cooling water injecting portion disposed in the backflow prevention chamber and adapted to lead and spray cooling water from the water jacket to the exhaust gas in the backflow prevention chamber.

12. The exhaust structure for a small watercraft according to claim 11, wherein the backflow prevention chamber is internally provided with a gas introduction pipe adapted to lead the exhaust gas into the backflow prevention chamber from the exhaust pipe, the gas introduction pipe is disposed to extend across above the outlet of the backflow prevention chamber, and a cooling water injection port of the cooling water injecting portion is disposed in the vicinity of the outlet of the gas introduction pipe.

13. The exhaust structure for a small watercraft according to claim 11, wherein the cooling water injecting portion includes:

a cooling water passage adapted to lead the cooling water from the water jacket; and a cooling water injection port adapted to inject and spray the cooling water led through the cooling water passage to the exhaust gas in the backflow prevention chamber, wherein the cooling water passage is formed of a member independent of the backflow prevention chamber.

14. The exhaust structure for a small watercraft according to claim 11, wherein the cooling water injecting portion includes a cooling water passage that is in communication with the water jacket of the exhaust pipe.

15. The exhaust structure for a small watercraft according to claim 12, wherein the cooling water injecting portion includes a cooling water passage that is in communication with the water jacket of the exhaust pipe.

16. The exhaust structure for a small watercraft according to claim 11, wherein the backflow prevention chamber includes a generally cylindrical body, and the cooling water injecting portion includes at least one cooling water passage located outside of the generally cylindrical body.

17. The exhaust structure for a small watercraft according to claim 12, wherein the backflow prevention chamber includes a generally cylindrical body, and the cooling water injecting portion includes at least one cooling water passage located outside of the generally cylindrical body.

18. The exhaust structure for a small watercraft according to claim 13, wherein the backflow prevention chamber includes a generally cylindrical body, and the cooling water passage is located outside of the generally cylindrical body.

19. The exhaust structure for a small watercraft according to claim 11, wherein said backflow prevention chamber is in communication with an opening of a gas introduction pipe, and said cooling water injecting portion includes a cooling water injecting port disposed to spray cooling water adjacent the opening of the gas introduction pipe.

* * * * *